US010884884B2

(12) United States Patent
Blea et al.

(10) Patent No.: US 10,884,884 B2
(45) Date of Patent: Jan. 5, 2021

(54) REVERSAL OF THE DIRECTION OF REPLICATION IN A REMOTE COPY ENVIRONMENT BY TRACKING CHANGES ASSOCIATED WITH A PLURALITY OF POINT IN TIME COPIES

(71) Applicant: INTERNATIONAL BUSINESS MACHINES CORPORATION, Armonk, NY (US)

(72) Inventors: David R. Blea, Round Rock, TX (US); Anthony J. Ciaravella, Tucson, AZ (US); Marisa F. Roberson, Austin, TX (US); Damian Trujillo, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 15/467,861

(22) Filed: Mar. 23, 2017

(65) Prior Publication Data

US 2018/0276078 A1 Sep. 27, 2018

(51) Int. Cl.
*G06F 11/20* (2006.01)
(52) U.S. Cl.
CPC ...... *G06F 11/2064* (2013.01); *G06F 2201/84* (2013.01); *G06F 2201/855* (2013.01)
(58) Field of Classification Search
CPC .......... G06F 11/1451; G06F 11/1464; G06F 11/1469; G06F 3/0604; G06F 3/065; G06F 3/067; G06F 11/0264; G06F 2201/84; G06F 2201/855; G06F 1/06; G06F 1/12; G06F 9/345; G06F 11/1446; G06F 11/1448; G06F 11/1453; G06F 11/1456; G06F 11/1458; G06F 11/1461; G06F 11/1466; G06F 11/1471; G06F 11/2053; G06F 11/2056; G06F 11/2058; G06F 11/2061; G06F 11/2064; G06F 11/2066; G06F 11/2069;

(Continued)

(56) References Cited

U.S. PATENT DOCUMENTS 6,502,205 B1 * 12/2002 Yanai ................. G06F 3/0601
714/6.32
6,912,629 B1 * 6/2005 West ................. G06F 11/1456
711/161

(Continued)

OTHER PUBLICATIONS

D. Clitherow, et al., "IBM GDPS Family an Introduction to Concepts and Capabilities", IBM Corporation, IBM Redbooks document No. SG24-6374-11, Jul. 2016, pp. 406.

*Primary Examiner* — Yaima Rigol
(74) *Attorney, Agent, or Firm* — Rabindranath Dutta; Konrad Raynes Davda & Victor LLP

(57) ABSTRACT

A secondary volume of a remote computational device stores an asynchronous copy of a primary volume of a local computational device. The remote computational device generates a target volume that stores consistent data from the secondary volume, and also generates a plurality of point in time copies at a plurality of instants of time from the target volume. A restoration is made of data in the primary volume to at least one of the plurality of instants of time by using one or more data structures that provide identification of all tracks from the target volume that are to be written to the primary volume for restoring the data in the primary volume.

20 Claims, 10 Drawing Sheets

(58) Field of Classification Search
CPC ............. G06F 11/2071; G06F 11/2074; G06F 11/2076; G06F 11/2079; G06F 11/2082; G06F 11/2084; G06F 11/2087; G06F 11/2092; G06F 11/2094; G11C 7/1072; G11C 7/22; G11C 7/222; G11C 8/18; G11C 29/023; G11C 29/56012
USPC .................................................. 711/161–162
See application file for complete search history.

(56) References Cited

U.S. PATENT DOCUMENTS

| | | | | |
|---|---|---|---|---|
| 7,890,461 B2* | 2/2011 | Oeda | .................. | G06F 11/1471 707/612 |
| 7,966,463 B2* | 6/2011 | Mizuta | ................. | G06F 11/2082 711/114 |
| 8,151,047 B2* | 4/2012 | Nakagawa | .......... | G06F 11/2069 709/224 |
| 8,250,323 B2* | 8/2012 | Benhase | ............. | G06F 11/2082 711/162 |
| 8,335,761 B1 | 12/2012 | Natanzon | | |
| 8,745,006 B2* | 6/2014 | Hiwatashi | ........... | G06F 11/2058 707/653 |
| 8,874,527 B2* | 10/2014 | Gardner | ............. | G06F 11/1469 707/679 |
| 9,251,230 B2* | 2/2016 | Brown | ............. | G06F 17/30575 |
| 2004/0260899 A1* | 12/2004 | Kern | .................. | G06F 11/2058 711/162 |
| 2005/0071708 A1* | 3/2005 | Bartfai | ................ | G06F 11/2064 714/6.3 |
| 2005/0171979 A1* | 8/2005 | Stager | ................. | G06F 11/1466 |
| 2005/0223271 A1* | 10/2005 | Butterworth | ........ | G06F 11/2082 714/6.3 |
| 2005/0251633 A1* | 11/2005 | Micka | ................. | G06F 11/2058 711/162 |
| 2007/0088924 A1* | 4/2007 | Jean-Denis | ......... | G06F 11/2082 711/162 |
| 2008/0172572 A1* | 7/2008 | Beardsley | ........... | G06F 11/2069 714/6.12 |
| 2008/0282049 A1* | 11/2008 | Kawamura | ......... | G06F 11/1471 711/162 |
| 2009/0006794 A1* | 1/2009 | Mizuta | ................ | G06F 11/2074 711/162 |
| 2010/0205392 A1* | 8/2010 | Schnapp | ............. | G06F 11/2066 711/162 |
| 2011/0225124 A1* | 9/2011 | Agombar | ................ | G06F 3/061 707/639 |
| 2011/0258406 A1* | 10/2011 | Suetsugu | .............. | G06F 3/0608 711/162 |
| 2012/0311283 A1* | 12/2012 | Takahashi | ........... | G06F 11/2058 711/162 |
| 2013/0007389 A1* | 1/2013 | Patterson | ................ | G06F 3/061 711/162 |
| 2014/0108349 A1* | 4/2014 | Benhase | ............. | G06F 11/2082 707/639 |
| 2014/0108751 A1* | 4/2014 | Brown | .................. | G06F 11/1464 711/162 |
| 2014/0304224 A1* | 10/2014 | Lopez | ..................... | G06F 3/061 707/610 |
| 2016/0034481 A1 | 2/2016 | Kumarasamy et al. | | |
| 2016/0077917 A1* | 3/2016 | Battepati | ............. | G06F 11/1407 714/15 |
| 2016/0112407 A1 | 4/2016 | Nara et al. | | |
| 2017/0371567 A1* | 12/2017 | Piduri | ................... | G06F 3/0665 |
| 2018/0095854 A1* | 4/2018 | Apte | ..................... | G06F 3/0644 |

\* cited by examiner

REVERSAL OF THE DIRECTION OF REPLICATION IN A REMOTE COPY ENVIRONMENT BY TRACKING CHANGES ASSOCIATED WITH A PLURALITY OF POINT IN TIME COPIES

BACKGROUND

1. Field

Embodiments relate to the reversal of the direction of replication in a remote copy environment by tracking changes associated with a plurality of point in time copies.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

In many systems, data on one storage device may be copied to the same or another storage device so that access to data volumes may be provided from two different locations. The copying of a data set from a source volume to a target volume may be performed synchronously or asynchronously. In synchronous copy unless an acknowledgement is received that the data set has been written to the target volume, the host waits for the synchronous copy operation initiated by the host to complete, whereas in asynchronous copy the host does not have to wait for the asynchronous copy operation initiated by the host to complete.

Point in time copy allows creation of instantaneous, point in time snapshot copies of entire logical volumes or data sets. A point in time copy may involve physically copying all the data from source volumes to target volumes so that the target volume has a copy of the data as of a point in time. A point in time copy can also be made by logically making a copy of the data and then only copying data over when necessary. A point in time copy operations may also be referred to as flash operations.

When an application has one write that is dependent on the completion of another write, the application is said to have dependent writes. Using dependent writes, applications may manage the consistency of their data, so that a consistent state of the application data on storage devices is maintained, in the event of a failure in the host or the storage controller.

To maintain the consistency of data across multiple storage volumes at a remote backup location, certain storage controllers support the concept of a consistency group. Storage volumes in a copy relationship that are configured into a consistency group are maintained to ensure that a group of dependent updates made to the storage volumes at the primary location are made together as a unit on the storage volumes at the remote backup location to maintain data consistency.

Asynchronous remote copy is a mechanism that provides data replication over extended distances between two sites for business continuity, disaster recovery, and for other reasons. Asynchronous remote copy replicates the data asynchronously from a local site (e.g., a primary location) to a remote site.

FlashCopy* (FLC) is a type of point in time copy in which nearly instantaneous point in time snapshot copies of entire logical volumes or data sets may be created, and Global Mirror* (GM) provides data replication over extended distances via asynchronous copying with recovery point objectives (RPO) of as low as 3-5 seconds or less. Further details of Global Mirror may be found in the publication "IBM GDPS Family: An Introduction to Concepts and Capabilities", published Jul. 2016, by International Business Machines Corporation.

\* FlashCopy and Global Mirror are trademarks or registered trademarks of International Business Machines Corporation registered in many jurisdictions worldwide.

SUMMARY OF THE PREFERRED EMBODIMENTS

Provided are a method, system, and computer program product in which a secondary volume of a remote computational device stores an asynchronous copy of a primary volume of a local computational device. The remote computational device generates a target volume that stores consistent data from the secondary volume, and also generates a plurality of point in time copies at a plurality of instants of time from the target volume. A restoration is made of data in the primary volume to at least one of the plurality of instants of time by using one or more data structures that provide identification of all tracks from the target volume that are to be written to the primary volume for restoring the data in the primary volume. As a result, full copying of volumes from the remote to the local site is avoided.

In additional embodiments, by using the data structures, full copying of the target volume to the primary volume is avoided. As a result, restoration of data to the remote site takes a lesser amount of time in comparison to full copying of data.

In yet additional embodiments, the data structures comprise: a first bitmap associated with the primary volume that shows changes associated with a point in time copy at a first instant of time; and a second bitmap associated with the target volume that tracks changes since a restoration from a point in time copy generated at the first instant of time. As a result, the changes that are to be used for restoration are generated.

In further embodiments, the first bitmap and the second bitmap are merged for restoring the data in the primary volume. As a result, the totality of changes needed for restoral of data to the local site are generated.

In certain embodiments, merging of the first bitmap and the second bitmap provides the identification of all tracks from the target volume that are to be written to the primary volume for restoring the data in the primary volume. As a result, the incremental data needed for restoral of data to the local site are generated.

In further embodiments, input/output (I/O) on the primary volume is stopped to suspend asynchronous replication between the primary volume and the secondary volume. A bitmap corresponding to the primary volume is created, wherein the bitmap indicates any changes to the primary volume at a first instant of time, and subsequently I/O to the primary volume is released. As a result, the bitmap stores incremental data that is used for restoring data to the local site.

In yet further embodiments, point in time copy operations are performed to generate a consistent copy of the data from the secondary volume to the target volume. The asynchronous replication is restarted from the primary volume to the secondary volume. Point in time copy operations are performed to generate an incremental cascaded point in time copy from the target volume to a point in time copy volume at the first instant of time with target write being inhibited. As a result, the local site may be restored to a consistent state saved in the point in time copy without copying full volumes from the remote site to the local site.

BRIEF DESCRIPTION OF THE DRAWINGS

Referring now to the drawings in which like reference numbers represent corresponding parts throughout.

DETAILED DESCRIPTION

Figure 1:
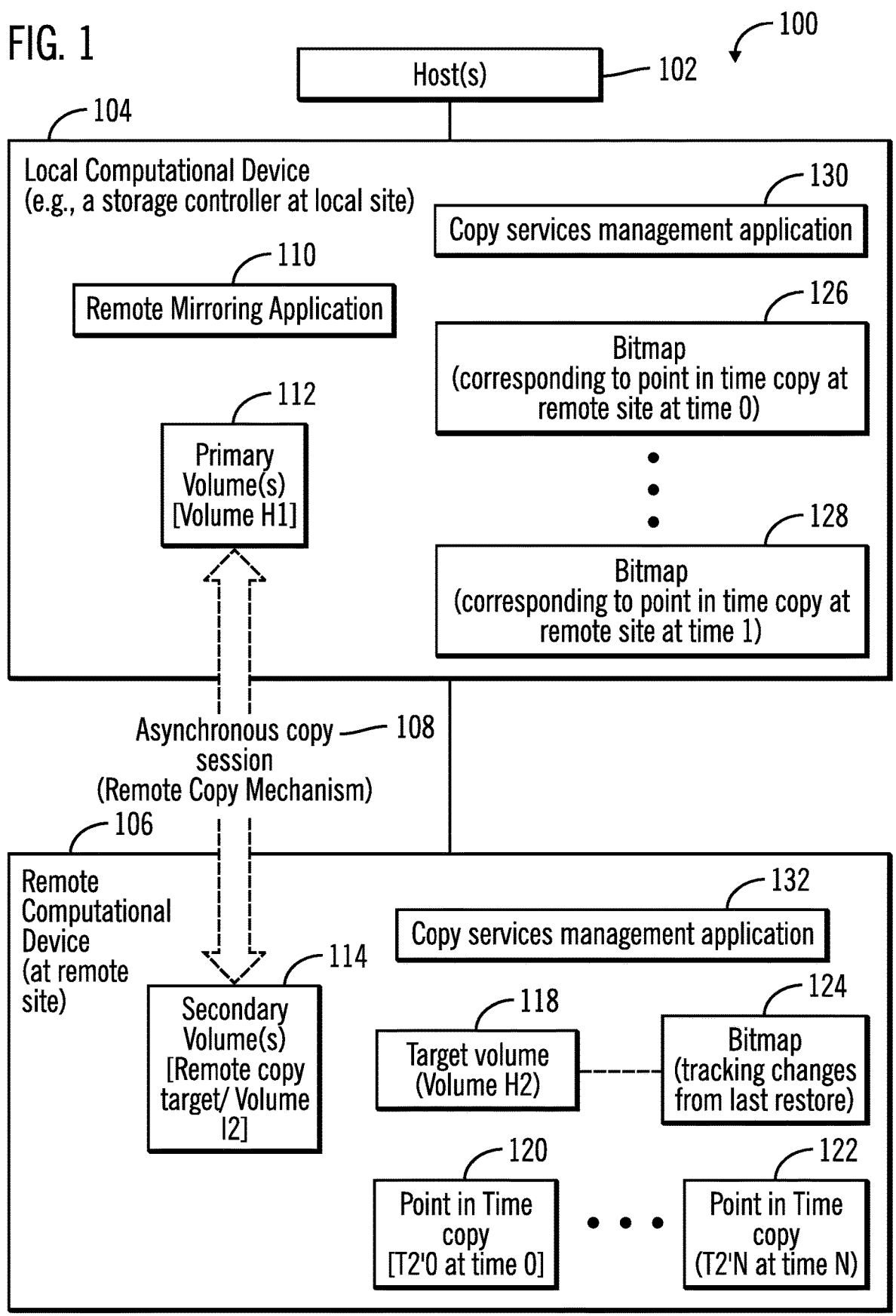
FIG. 1 illustrates a block diagram of a computing environment comprising one or more hosts, a local computational device at a local site, and a remote computational device at a remote site, in accordance with certain embodiments.

In the following description, reference is made to the accompanying drawings which form a part hereof and which illustrate several embodiments. It is understood that other embodiments may be utilized and structural and operational changes may be made.

In an asynchronous copy environment (e.g., a Global Mirror environment) a primary volume at a local site may be asynchronously copied via a remote copy mechanism to a secondary volume at a remote site. A point in time copy that uses the secondary volume (i.e., the remote copy target) as a point in time source volume is performed at an opportune time to generate a point in time target volume. The point in time target volume stores consistent data.

Continuous data protection (CDP) is a mechanism that allows customers to create multiple point in time backups of data, such that there are multiple potential recovery points that may be used to recover the data, in the event of a disaster or in the event of a corruption of data. In many situations a customer may create these multiple recovery points at a remote site rather than at a local site, where storage volumes that include the data are copied asynchronously from the local site to the remote site, i.e., secondary volumes of the remote site are in an asynchronous copy relationship with primary volumes of the local site.

In certain situations, when customers generate the point in time copies at the remote site, if a remote copy solution involves a "practice copy" of the data, then the point in time copies may be created from a point in time target instead of the remote copy target. A practice copy allows the customer to take a practice point in time copy of the data and restart data replication so that the customer maintains disaster recovery capabilities while the customer practices with the point in time copy. This practice copy however is also used in the event of a disaster so that the customer "practices the way they recover" by always attaching the hosts to the same set of volumes.

A problem may occur when the customer has to recover from any of the CDP copies (i.e., the multiple point in time copies) that the customer may have created. In such situations, the storages volumes that are used to attach to host systems are overwritten with the new data which means that in order to copy from the remote site back to the local site, a full copy of the data may be necessary. Certain embodiments addresses the ability to setup a remote CDP in a practice environment, without requiring a full copy to be copied to the local site thus speeding up the recovery time for customers and the time it takes for the customers to recover from a disaster.

Certain embodiments provide a mechanism for reducing the amount of time to return to a disaster recovery ready state, by using a previous point in time copy other than the last point in time copy taken, by tracking changes stored in data structures such as bitmaps, and without making a full copy of data from the remote site to the local site.

Exemplary Embodiments

FIG. 1 illustrates a block diagram of a computing environment 100 comprising one or more hosts 102, a local computational device 104 at a local site, and a remote computational device 106 at a remote site, where an asynchronous copy session 108 initiated by a remote mirroring application 110 may be used to asynchronously copy one or more primary volumes 112 controlled by the local computational device 104 to one or more secondary volumes 114 controlled by the remote computational device 106, in accordance with certain embodiments. The hosts 102 are shown coupled to the local computational device 104, but if the local computational device 104 is not operational or has errors then the hosts 102 may be coupled to the remote computational device 106 for performing input/output (I/O) operations.

The host 102, the local computational device 104, and the remote computational device 106 may comprise any suitable computational device including those presently known in the art, such as, a personal computer, a workstation, a server, a mainframe, a hand held computer, a palm top computer, a telephony device, a network appliance, a blade computer, a processing device, etc. The host 102, the local computational device 104 and the remote computational device 106 may be elements in any suitable network, such as, a storage area network, a wide area network, the Internet, an intranet, etc. In certain embodiments, the host 102, the local computational device 104 and the remote computational device 106 may be elements in a cloud computing environment. The local computational device 104 may be separated from the remote computational device 106 by an extended distance (e.g., over 5 kilometers). The host 102, the local computational device 104, and the remote computational device 106 may each be comprised of one or more computational devices.

In certain embodiments, the local computational device 104 may comprise a storage controller at the local site, where the local computational device 104 may control storage devices and allow one or more of the hosts 102 to perform input/output (I/O) operations on logical storage volumes maintained by the local computational device 104, and where the local computational device 102 also maintains physical storage volumes corresponding to logical storage volumes in the storage devices controlled by the local computational device 104.

The logical storage volumes maintained by the local computational device 104 at the local site may be referred to as primary volumes 112, and logical storage volumes maintained by the remote computational device 106 are referred to as secondary volumes 114. The remote mirroring application 110 that executes in the local computational device 104 may initiate the asynchronous copy session 108. The asynchronous copy session 108 asynchronously starts copying the primary volumes 112 to the remote computational device 106, where the remote computational device 106 maintains the asynchronous copes in logical storage volumes, referred to as secondary volumes 114.

In certain embodiments, write operations that occur to primary volumes 112 while the asynchronous copy session 108 is in progress may cause a lack of synchronization between the primary volumes 112 and the secondary volumes 114. A data structure that stores out of synchronization bitmaps that indicate which tracks have yet to be synchronized between the primary volumes 112 and secondary volumes 114, and data updates, are maintained in the remote computational device 106. At an opportune time, a target volume 118 that stores consistent data is generated via a point in time copy of the secondary volumes 114.

In certain embodiments, a plurality of point in time copies 120, 122 are generated at different instants of time from the target volume 118, such that a customer may restore data at the local computational device 104 to any of the different instants of time.

Associated with the target volume 118 is a data structure, such as a bitmap 124 that tracks changes made since a last restoration of data to the local computational device 104 from the remote computational device 106.

Associated with the primary volumes 112 are one or more data structures such as bitmaps 126, 128 that shows changes associated with point in time copies 120, 122.

In certain embodiments, copy services management applications 130, 132 may generate and use the bitmaps 126, 128 and 124 to restore the primary volumes 112 from the remote computational device 106 without copying full volumes from the remote computational device 106.

In certain embodiments, the primary volumes 112 may also be referred to as volume H1, the secondary volumes 114 as volume I2, the target volume 118 as volume H2, and a plurality of N point in time copies 120, 122 may be referred to as T2'0, T2'1, . . . T2'N.

Figure 2:
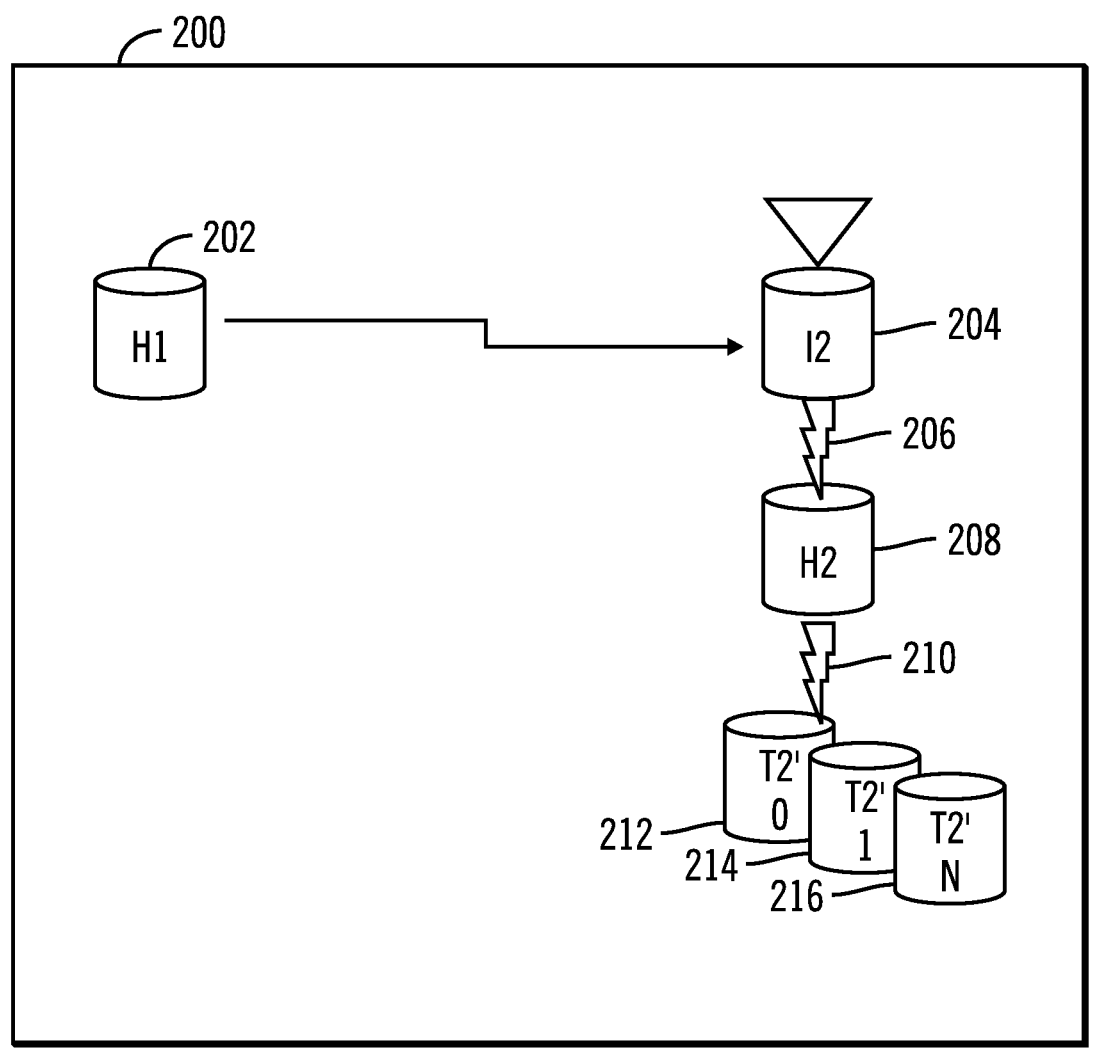
FIG. 2 illustrates a block diagram that shows generation of a plurality of consistent point in time copies for potential restoration of data, in accordance with certain embodiments.

FIG. 2 illustrates a block diagram 200 in which the copy from volume H1 202 (e.g., primary volume 112 of FIG. 1) to volume I2 204 (e.g., secondary volume 114 of FIG. 1) is a remote copy. A point in time copy 206 is then taken to volume H2 208 (the target volume 118 of FIG. 1) which is used as the "practice" copy of the customer. Volume H2 208 is used in the event of a disaster so that the customer may practice the way they recover. Hosts 102 may be attached to the H1 202 and H2 208 volumes. In order to have multiple recovery points, the copy services management applications 130, 132 may backup (shown via reference numeral 210) each point in time copy performed to volume H2 208, to another point in time target 212, 214, 216 for N number of copies. This provides the customer N number of backups to restore from, where T2'0 212 represents the point in time copy taken at time 0, T2'1 214 represents the point in time copy taken at time 1, and T2'N 216 represents the point in time copy taken at time N. However, when a customer selects one of the T2'0, T2'1, T2'N 214, 216, 218 copies (e.g. select T2'x performed at time x), and performs the restoration back to volume H2 208, volume H2 208 may have undone some of the changes that occurred and were replicated from volume H1 202, since time x. When the customer attempts to reestablish volume H2 208 back to volume H1 202 to get back to the local site 104, there is no record of what changes were performed on volume H1 202, so the establish from volume H2 208 to volume H1 202 has to copy every single track between the volumes. Across a session with thousands of volumes this may take a considerable amount of time.

Figure 3:
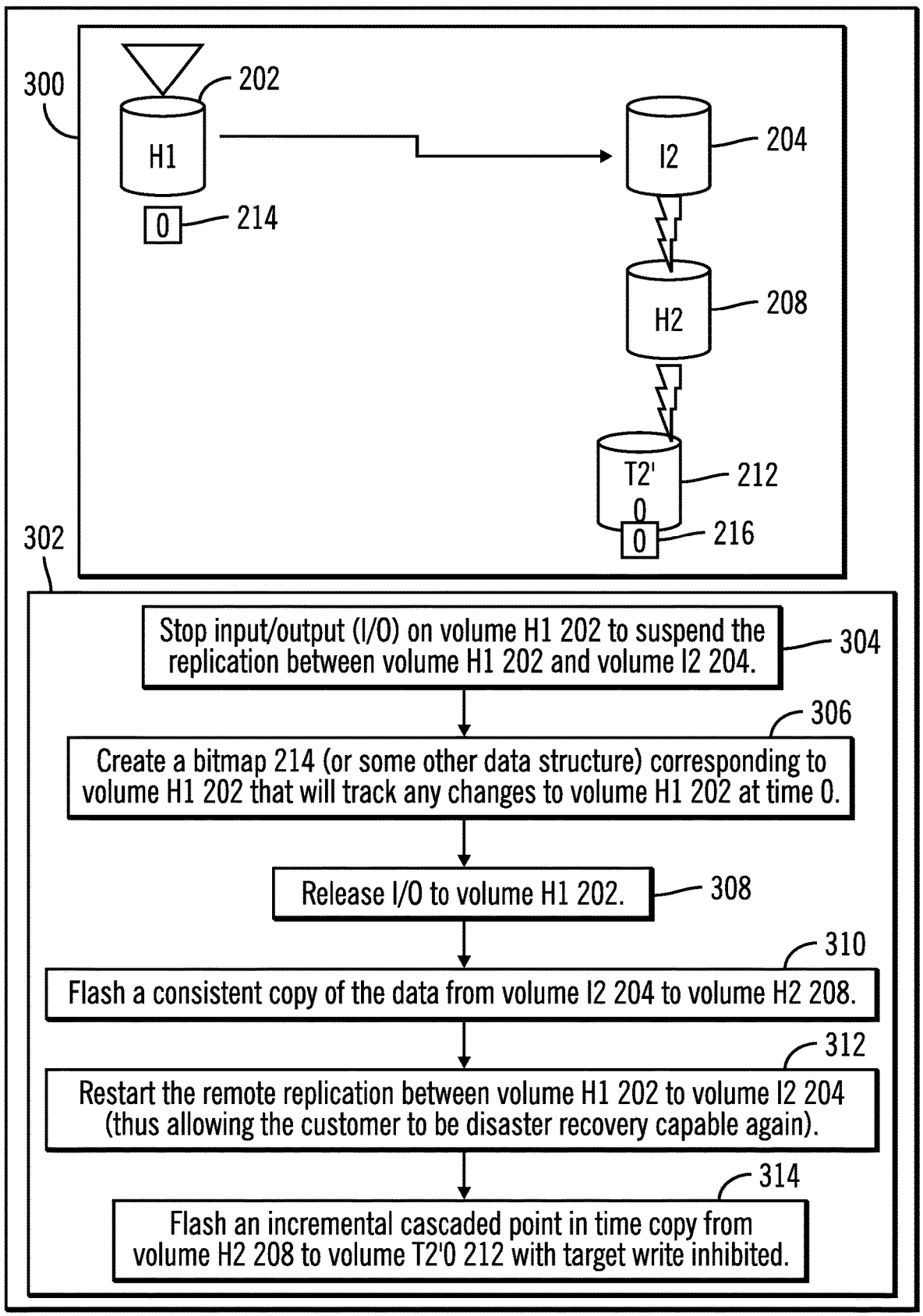
FIG. 3 illustrates a block diagram and a flowchart for restoring data to a local site without copying full volumes from the remote site, in accordance with certain embodiments.

FIG. 3 illustrates a block diagram 300 that shows the first point in time copy T2'0 212 created at time 0. In FIG. 3, volume H1 202 and volume I2 204 are in a remote copy relationship. When the customer wants the time 0 copy (T2'0 212), the copy services management applications 130, 132 may perform the following operations as shown in flowchart 302:

(1) Stop input/output (I/O) on volume H1 202 to suspend the replication between volume H1 202 and volume I2 204 [at block 304].

(2) Create a bitmap 214 (or some other data structure) corresponding to volume H1 202 that will track any changes to volume H1 202 at time 0 [at block 306].

(3) Release I/O to volume H1 202 [at block 308].

(4) Flash (i.e., perform point in time copy operations) a consistent copy of the data from volume I2 204 to volume H2 208 [at block 310].

(5) Restart the remote replication between volume H1 202 to volume I2 204 (thus allowing the customer to be disaster recovery capable again) [at block 312].

(6) Flash an incremental cascaded point in time copy from volume H2 208 to volume T2'0 212 with target write inhibited [at block 314].

The bitmap 214 indicates the changes to tracks between volume H2 208 and volume H1 202 at time 0. This bitmap 214 is also shown associated with the first point in time copy T2'0 212 (via reference numeral 216).

Figure 4:
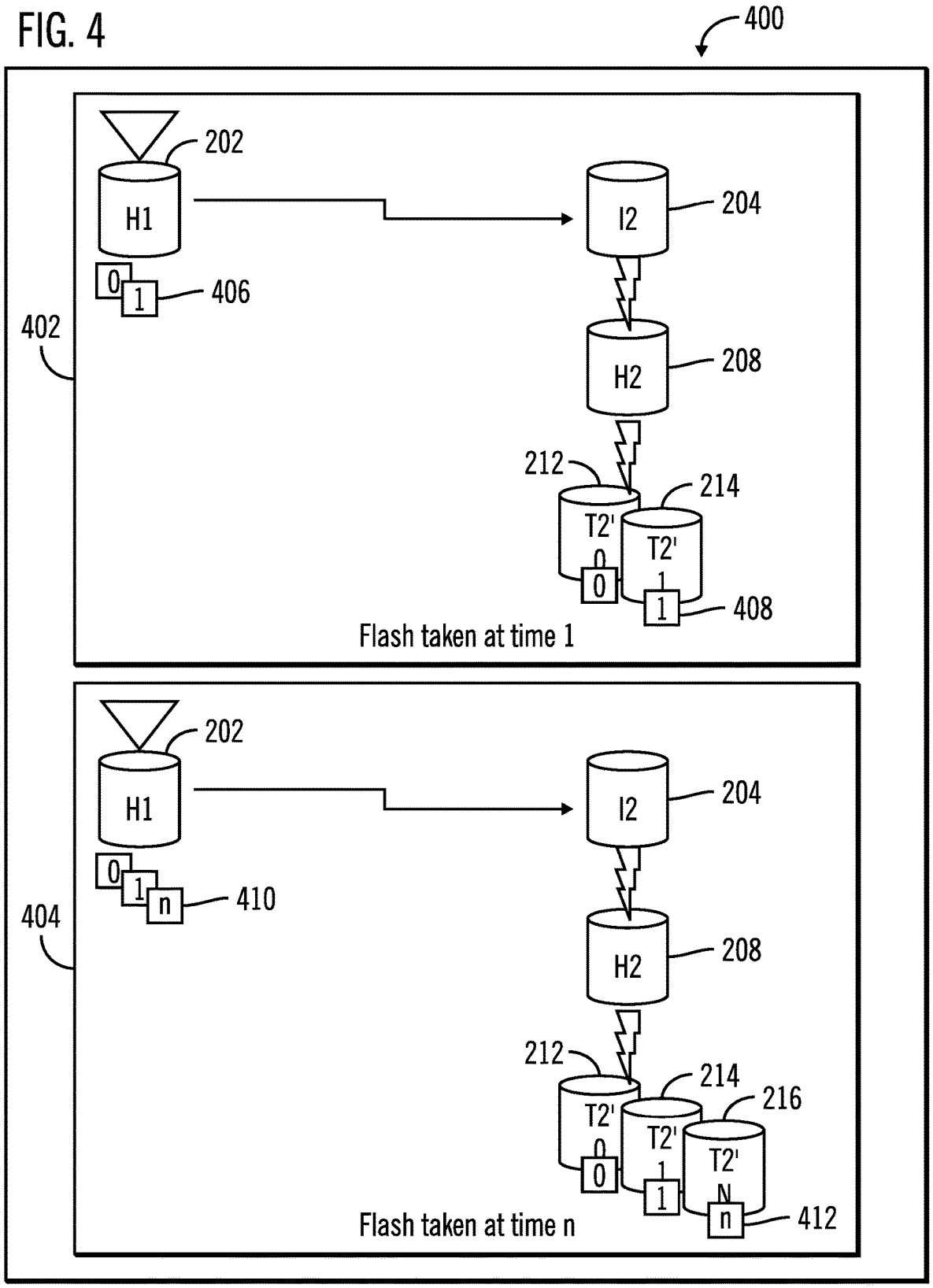
FIG. 4 illustrates a block diagram that shows point in time copies taken at different instants of time, in accordance with certain embodiments.

FIG. 4 shows a block diagram 400 in which for each subsequent point in time copies desired by the customer, operations similar to operations shown in flowchart 302 of FIG. 3 are performed. Block 402 shows the flash taken at time 1 to generate the point in time copy T2'1 214 with the associated bitmap 408 that indicates the changes to tracks between volume H2 208 and volume H1 202 at time 1, where the bitmap 408 is also shown as bitmap 406 and shown associated with volume H1 202.

Block 404 shows the flash taken at time N to generate the point in time copy T2'N 216 with the associated bitmap 412 that indicates the changes to tracks between volume H2 208 and volume H1 202 at time N, where the bitmap 412 is also shown as bitmap 410 and shown associated with volume H1 202.

In the event of a disaster, the customer may recover to the remote site 106 and may choose to recover from any of the 0 to N point in time copies 212, 214, 216 in case there was an issue with the latest copy, such as database corruption that was replicated to the remote site 106.

Figure 5:
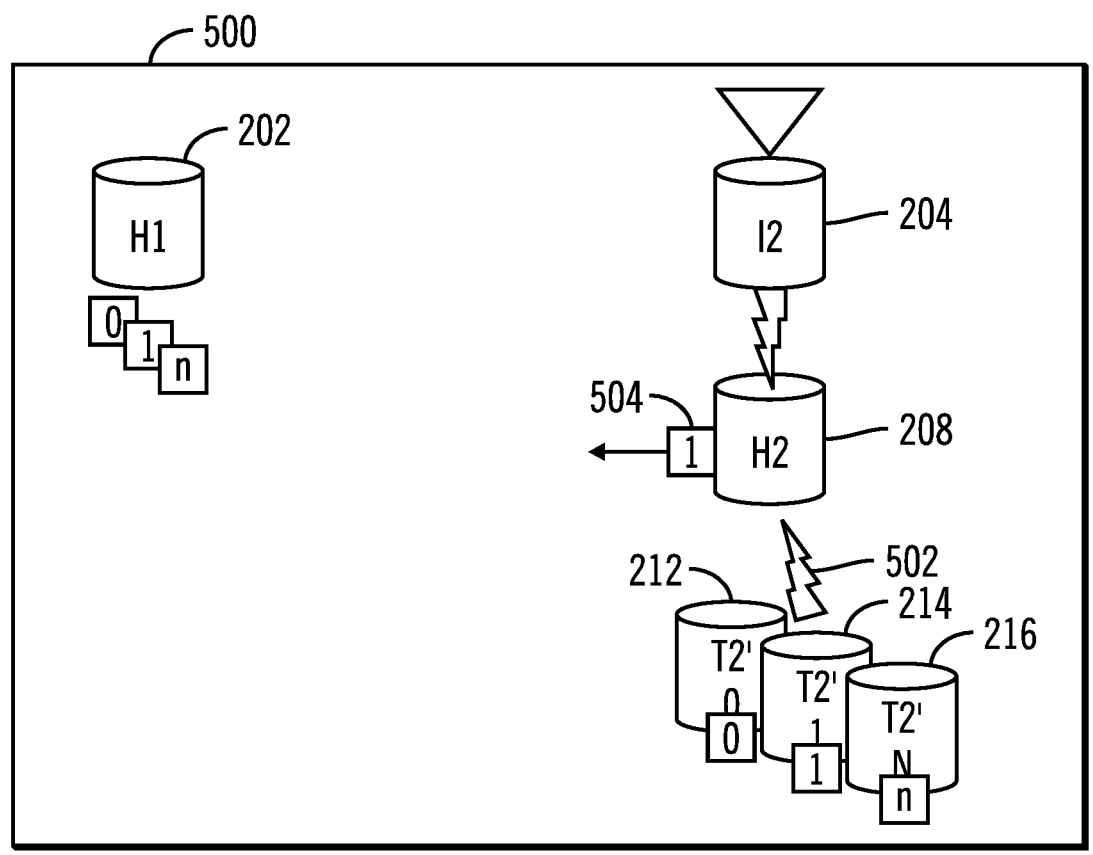
FIG. 5 illustrates a block diagram that shows bitmaps associated with a target volume, in accordance with certain embodiments.

FIG. 5 shows a block diagram 500 in which in order to perform a restoration, the customer chooses to go back to the volume T2'1 214 (point in time copy at time 1). Existing Flashcopy technology on storage systems, may track the changes to volume H2 208 since the flash was taken in a bitmap that allows the storage system to restore back to the source. So a restore from volume T2'1 214 is performed to volume H2 208 (as shown via reference numeral 502), so that after the restoration volume H2 208 has the exact data that was flashed at time 1. Any writes that were replicated after time 1 were overwritten. Restoring volume H2 208 allows the customer to bring production back up at the remote site 106. However, customers need to reverse the direction of the copy as soon as possible, so that they can once again be disaster recovery capable in the event that a disaster then occurs at the remote site 106. This means that the system now needs to track any changes that occur to volume H2 202 after the restoration. To achieve this, a bitmap may be used after the restore is issued, but before writes are allowed to volume H2 208. FIG. 5 shows that a restore (shown via reference numeral 502) was performed using the time 1 bitmap and now a new bitmap 504 associated with volume H2 208 has been formed, where the new bitmap 504 is tracking changes to volume H2 208 from that point on.

Figure 6:
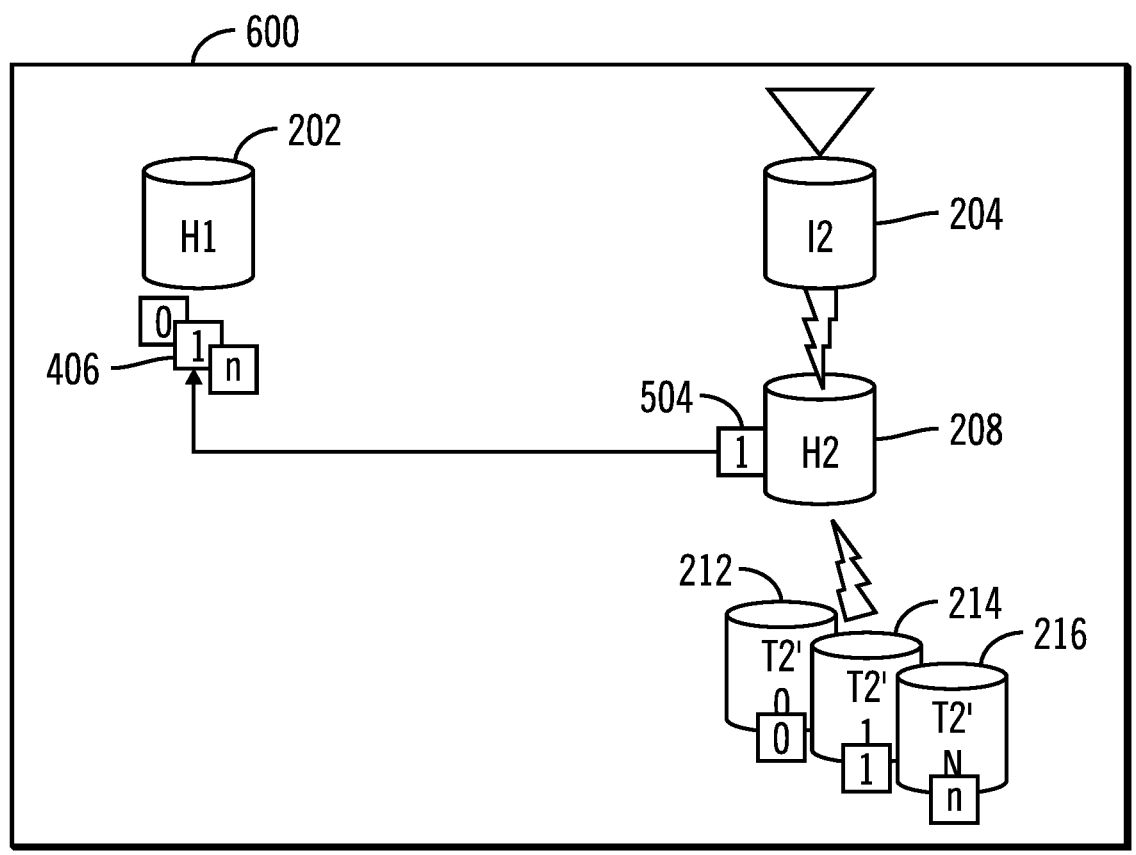
FIG. 6 illustrates a block diagram that shows merger of bitmaps to restore data to the local site, in accordance with certain embodiments.

FIG. 6 shows a block diagram 600 that shows how once volume H1 202 is active the customer reestablishes the copy from the remote site 106 back to the local site 104. Using the mechanism shown in block 306 of flowchart 302 (shown in FIG. 3) during the point in time copy at time 1 (which creates a bitmap on volume H1 202 to indicate what volume H1 202 stored at time 1), controlling software such as the copy services management applications 130, 132 may now indicate to the storage system to force a failback establish relationship from volume H2 208 back to volume H1 202 using the bitmap 504 at volume H2 that has been tracking changes since the restore from T2'1 214, and the bitmap 406 on H1 for the flash at time 1. Merging the bitmaps 406, 504 provides the details of all the tracks from volume H2 208 that should be written to volume H1 202. This would include all the tracks written to volume H2 208 after the restore, as well as all tracks written to volume H1 202 since the point in time copy at time 1 was generated.

Therefore FIG. 6 depicts that the embodiments are now copying data from volume H2 208 to volume H1 202. By merging the bitmaps 504, 406 a customer may avoid performing a full copy, and quickly return to a disaster recovery capable state.

Figure 7:
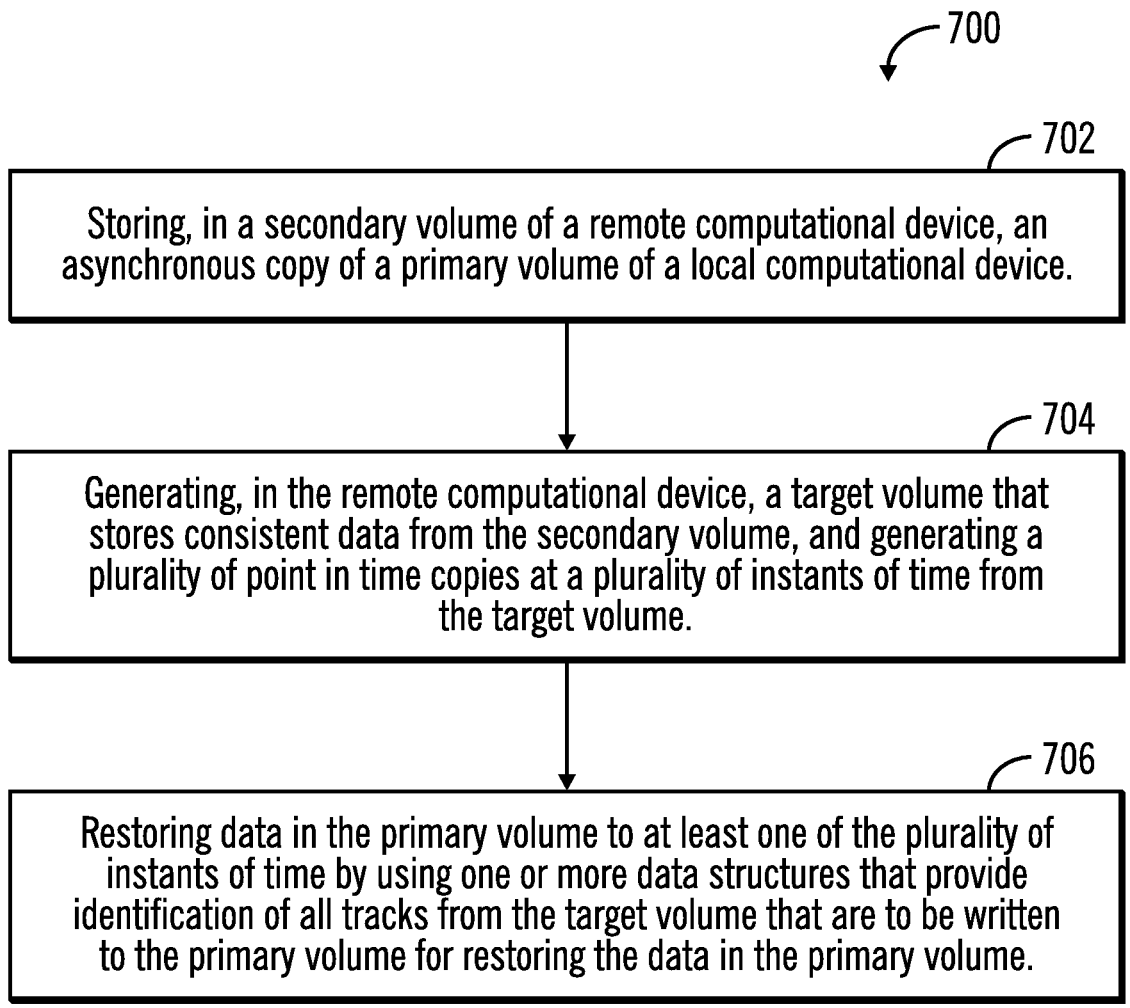
FIG. 7 illustrates a flowchart that shows restoration of data to a local site without copying full volumes from the remote site, in accordance with certain embodiments.

FIG. 7 illustrates a flowchart 700 that shows restoration of data to a local site 104 without copying full volumes from the remote site 106, in accordance with certain embodiments.

Control starts at block 702 in which a secondary volume 114 of a remote computational device 106 stores an asynchronous copy of a primary volume 112 of a local computational device 104. The remote computational device generates (at block 704) a target volume 118 that stores consistent data from the secondary volume 114, and also generates a plurality of point in time copies 120, 122 at a plurality of instants of time from the target volume 118.

From block 704 control proceeds to block 706 in which a restoration is made of data in the primary volume 112 to at least one of the plurality of instants of time by using one or more data structures 124, 126, 128 that provide identification of all tracks from the target volume 118 that are to be written to the primary volume 112 for restoring the data in the primary volume.

In additional embodiments, by using the data structures 124, 126, 128, full copying of the target volume to the primary volume is avoided. In yet additional embodiments, the data structures 124, 126, 128 comprise: a first bitmap 406 associated with the primary volume that shows changes associated with a point in time copy at a first instant of time; and a second bitmap 504 associated with the target volume that tracks changes since a restoration from a point in time copy generated at the first instant of time. The first bitmap 406 and the second bitmap 504 are merged for restoring the data in the primary volume. The merging of the first bitmap 406 and the second bitmap 504 provides the identification of all tracks from the target volume that are to be written to the primary volume for restoring the data in the primary volume.

Therefore FIGS. 1-7 illustrate certain embodiments for reducing the amount for time to reverse the direction of replication in an asynchronous copy environment in which a plurality of point in time copies are maintained in the remote site for restoration of data in the local site. When the direction of replication is reversed (i.e., the primary volume 112 of the local site is being restored), the embodiments avoid full copying of the volumes from the remote site to the local site by maintain identification of tracks that are to be copied from the remote site to the local site.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
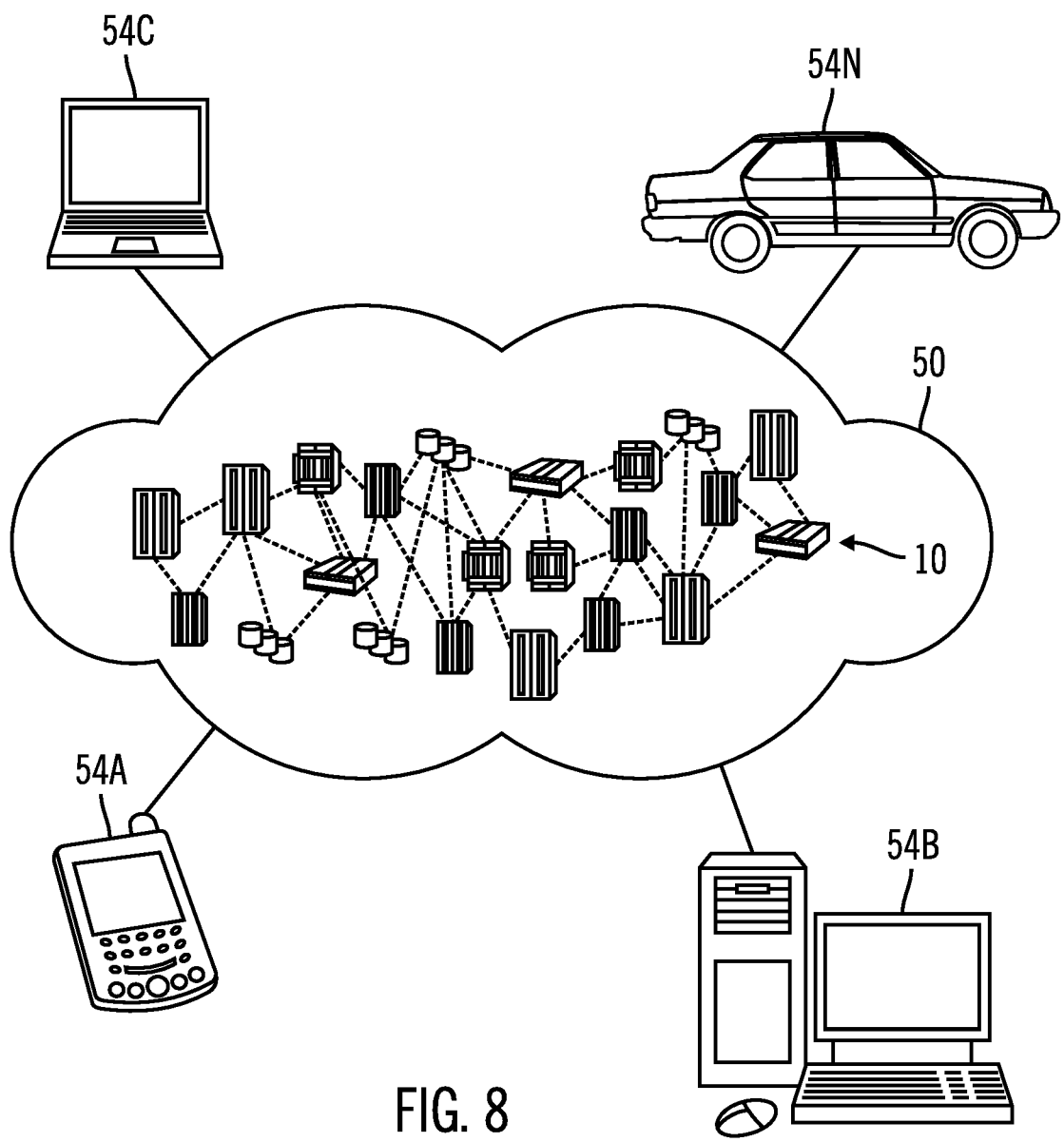
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
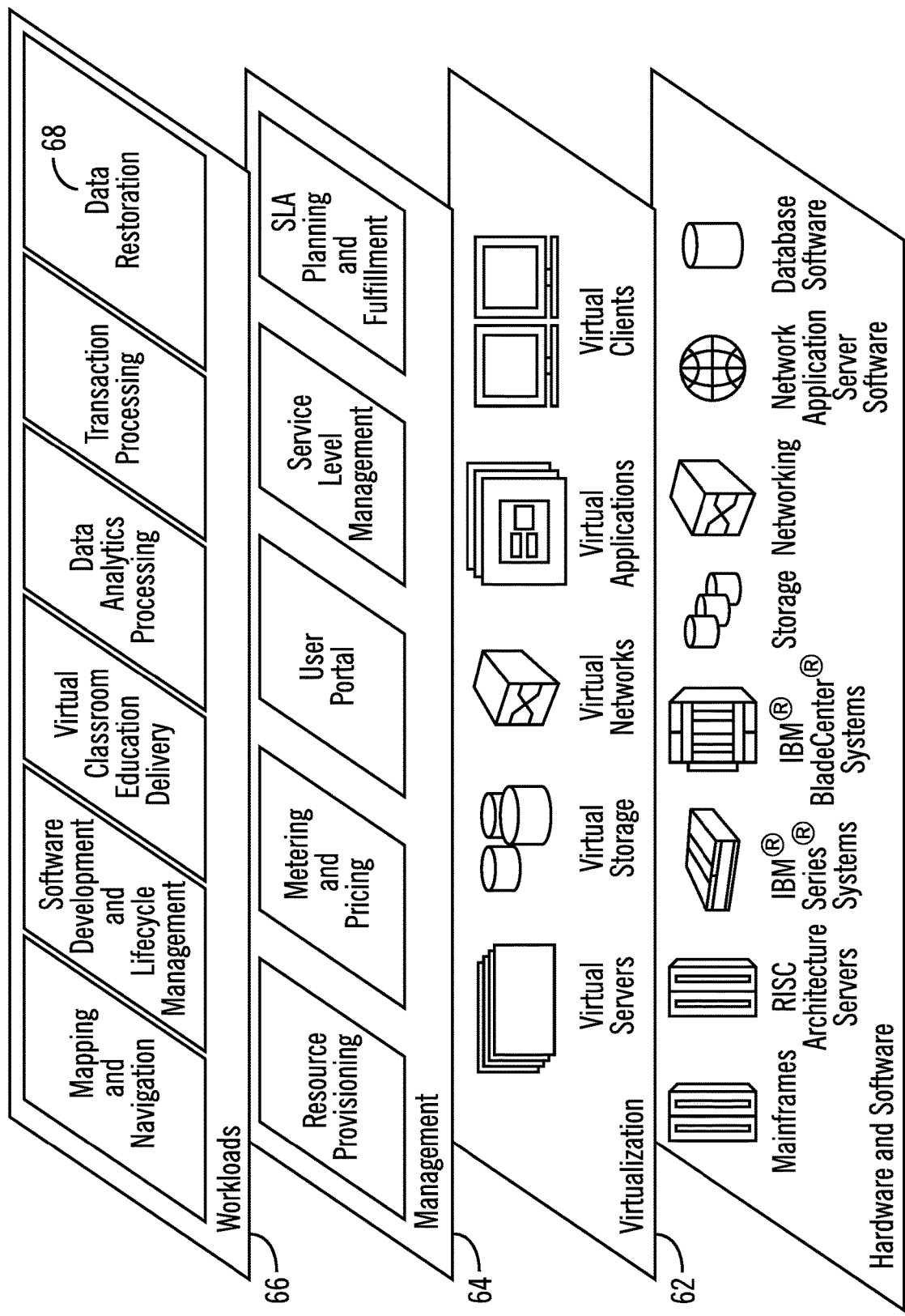
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems;

storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data restoration 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
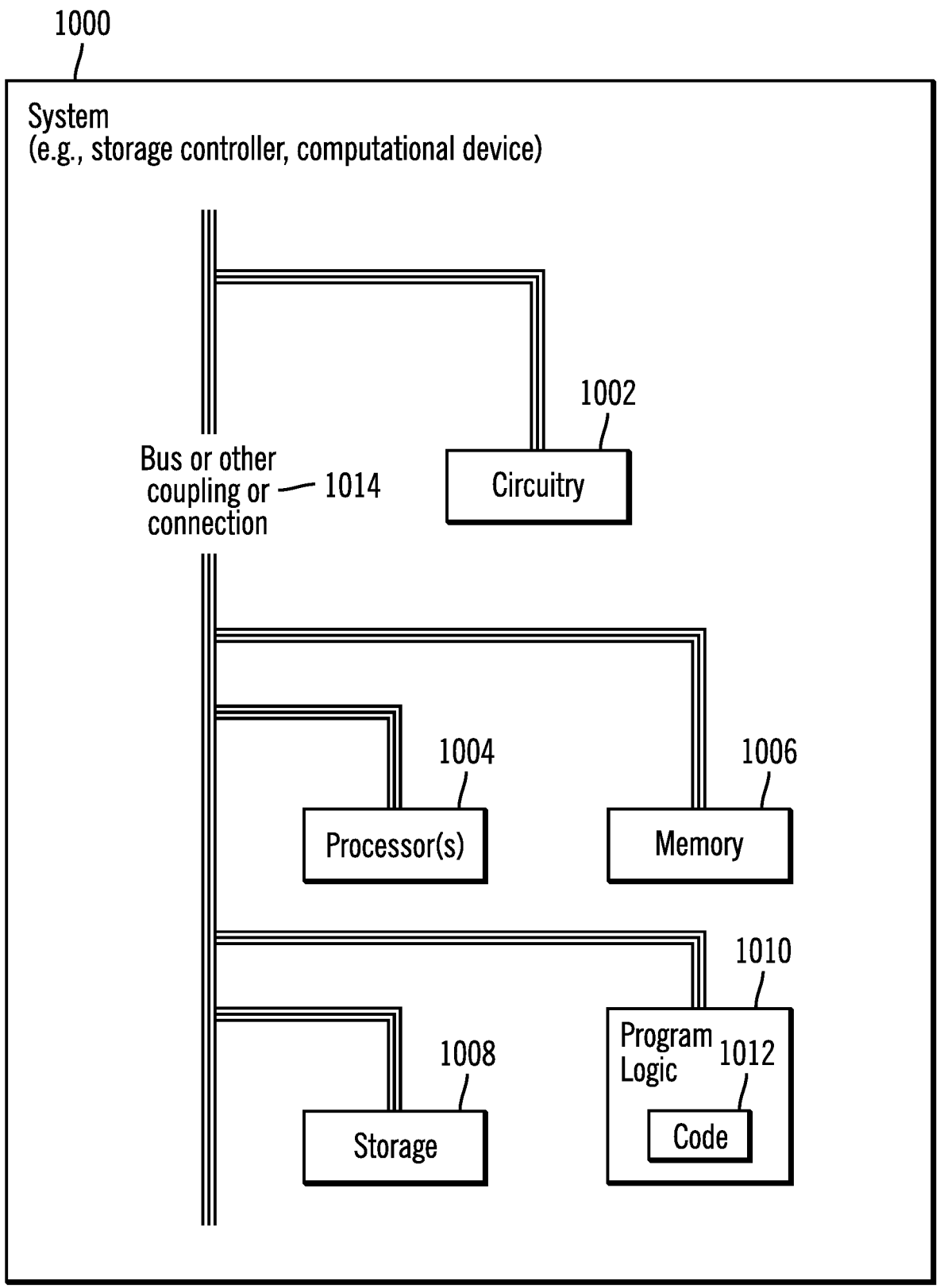
FIG. 10 illustrates a block diagram of a computational system that shows certain elements that may be included in the local and remote computational devices, as described in FIGS. 1-9, in accordance with certain embodiments.

FIG. 10 illustrates a block diagram that shows certain elements that may be included in the local computational device 104, the remote computational device 106, the hosts 102, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   storing, in a secondary volume of a remote computational device, an asynchronous copy of a primary volume of a local computational device;
   during a replication that is performed in a direction from the local computational device to the remote computational device, generating, in the remote computational device, a target volume that stores consistent data from the secondary volume, and generating a plurality of point in time copies at a plurality of instants of time from the target volume, wherein the target volume is a practice copy for a customer and the plurality of point in time copies have been created by the customer, and wherein storage volumes communicatively coupled to a host have been overwritten with new data at a time the customer has to restore data from any of the plurality of point in time copies; and
   in response to reversing the direction of replication from the local computational device to the remote computational device to perform replication from the remote computational device to the local computational device, restoring data in the primary volume to at least one of the plurality of instants of time by using one or more data structures that provide identification of all tracks from the target volume that are to be written to the primary volume for restoring the data in the primary volume, wherein the data structures comprise a first bitmap associated with the primary volume that shows changes associated with a point in time copy at a first instant of time, a second bitmap associated with the target volume that tracks changes since a restoration from a point in time copy generated at the first instant of time, wherein the first bitmap and the second bitmap are merged for restoring the data in the primary volume by providing the identification of all tracks from the target volume that are to be written to the primary volume for restoring the data in the primary volume, wherein a previous point in time copy generated prior to a last point in time copy at the remote computational device is used for restoring data in the primary volume by tracking changes stored in the one or more data structures without performing a full copying of data from the remote computational device to the local computational device, wherein to track any changes that occur to a selected target volume after a restore, a new bitmap is formed after the restore is issued but before writes are allowed to the selected target volume, wherein the restore is performed using an earlier formed bitmap than the new bitmap, and wherein the new bitmap tracks changes to the selected target volume from a time the restore is issued.

2. The method of claim 1, wherein by using the data structures, full copying of the target volume to the primary volume is avoided.

3. The method of claim 1, the method further comprising:
   stopping input/output (I/O) on the primary volume to suspend asynchronous replication between the primary volume and the secondary volume; and
   creating a bitmap corresponding to the primary volume, wherein the bitmap indicates any changes to the primary volume at a first instant of time, and subsequently releasing I/O to the primary volume.

4. The method of claim 3, the method further comprising:
   performing point in time copy operations to generate a consistent copy of the data from the secondary volume to the target volume restarting the asynchronous replication from the primary volume to the secondary volume; and
   performing point in time copy operations to generate an incremental cascaded point in time copy from the target volume to a point in time copy volume at the first instant of time with target write being inhibited.

5. A system, comprising:
   a memory; and
   one or more processors coupled to the memory, wherein the one or more processors perform operations, the operations comprising:
   storing, in a secondary volume of a remote computational device, an asynchronous copy of a primary volume of a local computational device;
   during a replication that is performed in a direction from the local computational device to the remote computational device, generating, in the remote computational device, a target volume that stores consistent data from the secondary volume, and generating a plurality of point in time copies at a plurality of instants of time from the target volume, wherein the target volume is a practice copy for a customer and the plurality of point in time copies have been created by the customer, and wherein storage volumes communicatively coupled to a host have been overwritten with new data at a time the customer has to restore data from any of the plurality of point in time copies; and
   in response to reversing the direction of replication from the local computational device to the remote computational device to perform replication from the remote computational device to the local computational device, restoring data in the primary volume to at least one of the plurality of instants of time by using one or more data structures that provide identification of all tracks from the target volume that are to be written to the primary volume for restoring the data in the primary volume, wherein the data structures comprise a first bitmap associated with the primary volume that shows changes associated with a point in time copy at a first instant of time, a second bitmap associated with the target volume that tracks changes since a restoration from a point in time copy generated at the first instant of time, wherein the first bitmap and the second bitmap are merged for restoring the data in the primary volume by providing the identification of all tracks from the target volume that are to be written to the primary volume for restoring the data in the primary volume, wherein a previous point in time copy generated prior to a last point in time copy at the remote computational device is used for restoring data in the primary volume by tracking changes stored in the one or more data structures without performing a full copying of data from the remote computational device to the local computational device, wherein to track any changes that occur to a selected target volume after a restore, a new bitmap is formed after the restore is issued but before writes are allowed to the selected target volume, wherein the restore is performed using an earlier formed bitmap than the new bitmap, and wherein the new bitmap tracks changes to the selected target volume from a time the restore is issued.

6. The system of claim 5, wherein by using the data structures, full copying of the target volume to the primary volume is avoided.

7. The system of claim 5, the operations further comprising:
stopping input/output (I/O) on the primary volume to suspend asynchronous replication between the primary volume and the secondary volume; and
creating a bitmap corresponding to the primary volume, wherein the bitmap indicates any changes to the primary volume at a first instant of time, and subsequently releasing I/O to the primary volume.

8. The system of claim 7, the operations further comprising:
performing point in time copy operations to generate a consistent copy of the data from the secondary volume to the target volume restarting the asynchronous replication from the primary volume to the secondary volume; and
performing point in time copy operations to generate an incremental cascaded point in time copy from the target volume to a point in time copy volume at the first instant of time with target write being inhibited.

9. A computer program product, the computer program product comprising a computer readable storage medium having computer readable program code embodied therewith, the computer readable program code configured to perform operations, the operations comprising:
storing, in a secondary volume of a remote computational device, an asynchronous copy of a primary volume of a local computational device;
during a replication that is performed in a direction from the local computational device to the remote computational device, generating, in the remote computational device, a target volume that stores consistent data from the secondary volume, and generating a plurality of point in time copies at a plurality of instants of time from the target volume, wherein the target volume is a practice copy for a customer and the plurality of point in time copies have been created by the customer, and wherein storage volumes communicatively coupled to a host have been overwritten with new data at a time the customer has to restore data from any of the plurality of point in time copies; and
in response to reversing the direction of replication from the local computational device to the remote computational device to perform replication from the remote computational device to the local computational device, restoring data in the primary volume to at least one of the plurality of instants of time by using one or more data structures that provide identification of all tracks from the target volume that are to be written to the primary volume for restoring the data in the primary volume, wherein the data structures comprise a first bitmap associated with the primary volume that shows changes associated with a point in time copy at a first instant of time, a second bitmap associated with the target volume that tracks changes since a restoration from a point in time copy generated at the first instant of time, wherein the first bitmap and the second bitmap are merged for restoring the data in the primary volume by providing the identification of all tracks from the target volume that are to be written to the primary volume for restoring the data in the primary volume, wherein a previous point in time copy generated prior to a last point in time copy at the remote computational device is used for restoring data in the primary volume by tracking changes stored in the one or more data structures without performing a full copying of data from the remote computational device to the local computational device, wherein to track any changes that occur to a selected target volume after a restore, a new bitmap is formed after the restore is issued but before writes are allowed to the selected target volume, wherein the restore is performed using an earlier formed bitmap than the new bitmap, and wherein the new bitmap tracks changes to the selected target volume from a time the restore is issued.

10. The computer program product of claim 9, wherein by using the data structures, full copying of the target volume to the primary volume is avoided.

11. The computer program product of claim 9, the operations further comprising:
stopping input/output (I/O) on the primary volume to suspend asynchronous replication between the primary volume and the secondary volume; and
creating a bitmap corresponding to the primary volume, wherein the bitmap indicates any changes to the primary volume at a first instant of time, and subsequently releasing I/O to the primary volume.

12. The computer program product of claim 11, the operations further comprising:
performing point in time copy operations to generate a consistent copy of the data from the secondary volume to the target volume restarting the asynchronous replication from the primary volume to the secondary volume; and
performing point in time copy operations to generate an incremental cascaded point in time copy from the target volume to a point in time copy volume at the first instant of time with target write being inhibited.

13. A remote computational device coupled to a local computational device, the remote computational device comprising:
a memory; and
one or more processors coupled to the memory, wherein the one or more processors perform operations, the operations comprising:
storing, in a secondary volume of the remote computational device, an asynchronous copy of a primary volume of the local computational device; and
during a replication that is performed in a direction from the local computational device to the remote computational device, generating, in the remote computational device, a target volume that stores consistent data from the secondary volume, and generating a plurality of point in time copies at a plurality of instants of time from the target volume, wherein the target volume is a practice copy for a customer and the plurality of point in time copies have been created by the customer, and wherein storage volumes communicatively coupled to a host have been overwritten with new data at a time the customer has to restore data from any of the plurality of point in time copies, wherein in response to reversing the direction of replication from the local computational device to the remote computational device to perform replication from the remote computational device to the local computational device, data is restored in the primary volume to at least one of the plurality of instants of time by using one or more data structures that provide identification of all tracks from the target volume that are to be written to the primary volume for restoring the data in the primary volume, wherein the data structures comprise a first bitmap associated with the primary volume that shows changes associated with a point in time copy at a first instant of time, a second bitmap associated with the target volume that tracks changes since a restoration from a point in time copy generated at the first instant of time, wherein the first bitmap and the second bitmap are merged for restoring the data in the primary volume by providing the identification of all tracks from the target volume that are to be written to the primary volume for restoring the data in the primary volume, wherein a previous point in time copy generated prior to a last point in time copy at the remote computational device is used for restoring data in the primary volume by tracking changes stored in the one or more data structures without performing a full copying of data from the remote computational device to the local computational device, wherein to track any changes that occur to a selected target volume after a restore, a new bitmap is formed after the restore is issued but before writes are allowed to the selected target volume, wherein the restore is performed using an earlier formed bitmap than the new bitmap, and wherein the new bitmap tracks changes to the selected target volume from a time the restore is issued.

14. The remote computational device of claim 13, wherein by using the data structures, full copying of the target volume to the primary volume is avoided.

15. The remote computational device of claim 13, the operations further comprising:
stopping input/output (I/O) on the primary volume to suspend asynchronous replication between the primary volume and the secondary volume; and
creating a bitmap corresponding to the primary volume, wherein the bitmap indicates any changes to the primary volume at a first instant of time, and subsequently releasing I/O to the primary volume.

16. The remote computational device of claim 15, the operations further comprising:
performing point in time copy operations to generate a consistent copy of the data from the secondary volume to the target volume restarting the asynchronous replication from the primary volume to the secondary volume; and
performing point in time copy operations to generate an incremental cascaded point in time copy from the target volume to a point in time copy volume at the first instant of time with target write being inhibited.

17. A local computational device coupled to a remote computational device, the local computational device comprising:
a memory; and
one or more processors coupled to the memory, wherein the one or more processors perform operations, the operations comprising:
during a replication that is performed in a direction from the local computational device to the remote computational device, generating, in the remote computational device, a target volume that stores consistent data from a secondary volume of the remote computational device, and generating a plurality of point in time copies at a plurality of instants of time from the target volume, wherein the target volume is a practice copy for a customer and the plurality of point in time copies have been created by the customer, and wherein storage volumes communicatively coupled to a host have been overwritten with new data at a time the customer has to restore data from any of the plurality of point in time copies; and
in response to reversing the direction of replication from the local computational device to the remote computational device to perform replication from the remote computational device to the local computational device, restoring data in a primary volume of the local computational device to at least one of the plurality of instants of time by using one or more data structures that provide identification of all tracks from the target volume that are to be written to the primary volume for restoring the data in the primary volume, wherein the data structures comprise a first bitmap associated with the primary volume that shows changes associated with a point in time copy at a first instant of time, a second bitmap associated with the target volume that tracks changes since a restoration from a point in time copy generated at the first instant of time, wherein the first bitmap and the second bitmap are merged for restoring the data in the primary volume by providing the identification of all tracks from the target volume that are to be written to the primary volume for restoring the data in the primary volume, wherein a previous point in time copy generated prior to a last point in time copy at the remote computational device is used for restoring data in the primary volume by tracking changes stored in the one or more data structures without performing a full copying of data from the remote computational device to the local computational device, wherein to track any changes that occur to a selected target volume after a restore, a new bitmap is formed after the restore is issued but before writes are allowed to the selected target volume, wherein the restore is performed using an earlier formed bitmap than the new bitmap, and wherein the new bitmap tracks changes to the selected target volume from a time the restore is issued.

18. The local computational device of claim 17, wherein by using the data structures, full copying of the target volume to the primary volume is avoided.

19. The local computational device of claim 17, the operations further comprising:
stopping input/output (I/O) on the primary volume to suspend asynchronous replication between the primary volume and the secondary volume; and creating a bitmap corresponding to the primary volume, wherein the bitmap indicates any changes to the primary volume at a first instant of time, and subsequently releasing I/O to the primary volume.

20. The local computational device of claim 19, the operations further comprising:

performing point in time copy operations to generate a consistent copy of the data from the secondary volume to the target volume restarting the asynchronous replication from the primary volume to the secondary volume; and performing point in time copy operations to generate an incremental cascaded point in time copy from the target volume to a point in time copy volume at the first instant of time with target write being inhibited.

* * * * *